United States Patent

Srivastava et al.

[11] Patent Number: 5,847,750
[45] Date of Patent: Dec. 8, 1998

[54] METHOD OF ACCESSING A REPETITIVELY TRANSMITTED VIDEO PROGRAM

[75] Inventors: Gopal K. Srivastava, Burlington, N.J.;
Peter C. Skerlos, Long Grove, Ill.

[73] Assignee: Zenith Electronics Corporation, Glenview, Ill.

[21] Appl. No.: 89,320

[22] Filed: Jul. 9, 1993

[51] Int. Cl.$^6$ .................................................. H04N 7/173
[52] U.S. Cl. ................................................. 348/7; 348/12
[58] Field of Search .................................. 358/84, 85, 86; 348/7; H04N 7/173

[56] References Cited

U.S. PATENT DOCUMENTS

| | | | |
|---|---|---|---|
| 4,506,387 | 3/1985 | Walter | 358/86 |
| 5,200,825 | 4/1993 | Perine | 358/84 |
| 5,247,347 | 9/1993 | Litteral et al. | 358/85 |

*Primary Examiner*—John K. Peng

[57] ABSTRACT

A digital video communication system includes a two-way communication link between a source and a viewer. A video program, in sequential compressed digital form, is repetitively supplied to a fifo memory that has taps corresponding to the number of fixed length segments in the video program. The program is taken from one of the taps and supplied to a one segment-long fifo memory which has taps corresponding to fields in the segment. A program request by a viewer results in the segment at which the beginning of the program will next appear to be addressed and remembered. The field fifo is reset to the first tap and the video program data is processed and transmitted to the viewer from the first field tap. Should the viewer wish to interrupt the video program, a field counter is enabled by an interrupt signal to step over the field taps (at the field rate), thus "freezing" the program. The interrupt signal also causes the address counter to count up (change tap addresses) at the segment rate. When the interruption request is removed, the normal program transmission is restored from the "frozen" field of the video program.

8 Claims, 1 Drawing Sheet

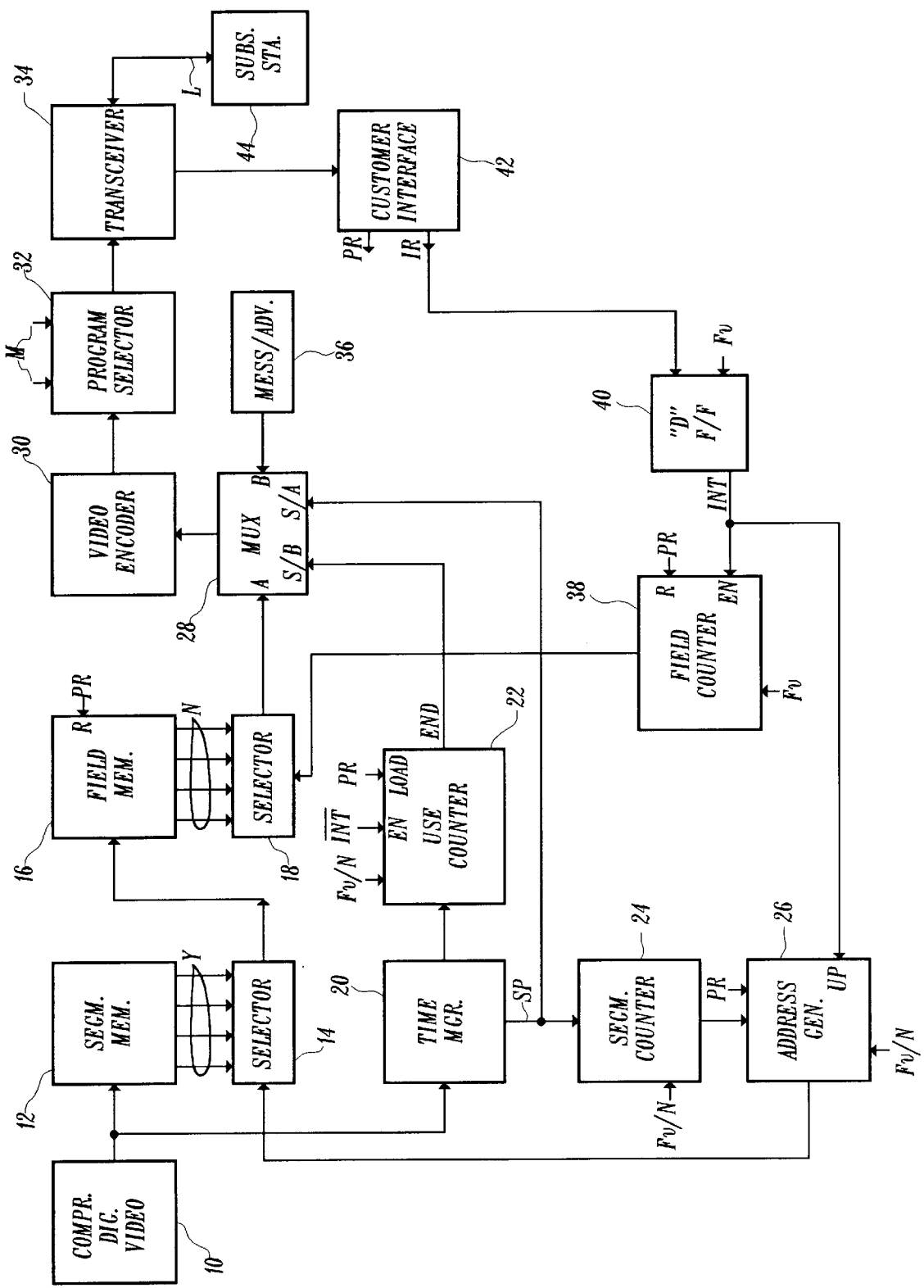

METHOD OF ACCESSING A REPETITIVELY TRANSMITTED VIDEO PROGRAM

BACKGROUND OF THE INVENTION AND PRIOR ART

This invention relates in general to video communications systems and in particular to video communications systems in which the viewer is provided with limited interaction with the video source. With the development of digital video and video compression and the rapidly decreasing cost and size of data memory, systems that require the retention of large amounts of video information are becoming much more practical. Presently, a cable subscriber wishing to view a particular pay-per-view cable television video program, such as a movie, must adapt his viewing schedule to the video program schedule of the cable head end and "tune" in at a particular time to assure that the beginning of the desired program is received. Once the video program has started, the viewer is unable to arbitrarily pause in his viewing without missing a portion of the program. In short, the viewer cannot "stop" or freeze the video program at his option and for his convenience.

The present invention enables the viewer to determine when to commence viewing of a partial video program and permits interruption of the program at times and for durations that are determined by his needs or desires without missing anything. The only limitation on the above is the gross time duration during which the particular video program is being repetitively transmitted by the program source.

OBJECTS OF THE INVENTION

A principal object of the invention is to provide a novel video transmission system.

Another object of the invention is to provide an interactive video transmission system that accommodates viewer flexibility.

BRIEF DESCRIPTION OF THE DRAWINGS

These and other objects and advantages of the invention will be apparent upon reading the following description in conjunction with the drawing, the single FIGURE of which is a simplified block diagram of a system constructed in accordance with the invention.

DESCRIPTION OF THE PREFERRED EMBODIMENT

Referring to the single figure of the drawing, a source of compressed digital video information 10 is coupled to a segment memory 12 that has a plurality of taps Y coupled to a selector 14. The compressed digital video information is in sequential form and comprises a video program consisting of a plurality of fixed length segments. The digital video information includes data which identifies the start or beginning of the video program and the end of the video program, e.g. the number of segments in the video program. The segment memory 12 is a fifo type (first in/first out) and the number of taps Y is equal to the number of segments in the video program. Therefore, the size of memory 12 is at least equal to the video program and, while the video program moves through the memory, the entire video program is always available in segment memory 12. Sequentially supplying the video program to memory 12 makes the beginning of the video program (and any other portion) always available by selection of the appropriate one of the taps Y. The output of the selector 14 is coupled to a field fifo memory 16.

Field memory 16 is one segment long and has a much larger plurality of taps N, each of which corresponds to a field in the segment. The video program from the selected one of the taps Y is coupled to field memory 16 and individual fields of the video program appear at successive ones of taps N. A selector 18 operates similar to selector 14 and selects the output signal from one of the taps N (as will be explained) and supplies it to an A input of a multiplexer 28. It will be appreciated that the entire video program is sequentially available and may be experienced through any combination of taps Y and N.

The digital video information includes timing information and is coupled to a time manager 20 in which the start of the video program is outputted in the form of a start program flag SP. Time manager 20 also supplies a use counter 22 with the number of segments in the video program. The start flag SP is coupled to a segment counter 24 and to the select A (S/A) input of multiplexer 28. Use counter 22 generates an END signal that is applied to a select B (S/B) input of multiplexer 28. The END signal is developed when the number of segments counted by the use counter is equal to the number of segments in the video program, as loaded into the use counter 22 from the time manager 20. Segment counter 24 is coupled to an address generator 26 which generates the sequential addresses for selecting the appropriate one of taps Y. These addresses are used to control selector 14. The output of multiplexer 28 is coupled to a video encoder where the digitized and compressed video program is encoded, in accordance with any number of well-known techniques, for transmission via a suitable communications link (L) to a viewer/subscriber.

The output of video encoder 30 is supplied to a program selector 32 which has a number of inputs (M) for permitting various other video programs to be accessed for transmission to a particular viewer/subscriber over the communications link L. It is thus contemplated that program selector 32 is coupled to a number of replications of the just-described elements to enable each of the other video programs to be made available to the subscriber. Program selector 32, in turn, supplies a transceiver 34 which is coupled via the two-way communications link L (e.g. fiber optic/cable system) to a viewer/customer site 44. An output of transceiver 34 supplies a customer interface block 42 with viewer-initiated command signals such as a PR (program request) signal and an IR (interrupt request) signal. The PR signal is supplied to the reset terminal of field memory 16, the load terminal of use counter 22, address generator 26 and to the reset terminal of a field counter 38. The IR (interrupt request) signal is coupled to a D flip/flop 40 which produces an interrupt signal that in turn is coupled to the UP input of address generator 26 and the EN (enable) input of field counter 38.

The two basic counting signals used are Fv (equal to the vertical field frequency) and Fv/N (equal to the segment frequency since N is equal to the number of fields per segment). The use counter 22 has an $\overline{INT}$ signal applied to its EN input and is enabled whenever the interrupt signal is not active.

In operation, the sequentially available digital video information, comprising a video program, is applied to segment memory 12 and one of the taps Y is selected in response to a viewer program request (PR). The number of the taps Y is arbitrary. In general, the number of taps Y will define segments of 10 to 15 minute durations. Consequently, in all likelihood, a customer program request will not immediately result in transmission of the desired video program. The time delay will be determined by where the beginning of the program falls with respect to the taps. In practice, the PR signal may be immediately responded to by supplying the viewer alternate informational video during the wait period. The wait period is, of course, determined by the time required for the video program beginning to reach one of the taps Y in fifo 12. A messenger/advertising block 36 which is coupled to the B input of multiplexer 28 is used to supply the alternate video during the wait period. During other periods, such as when the viewer is tuned to the channel but has not selected an offered video program, multiplexer 28 couples the output of messenger/advertising block 36 to video encoder 30 for transmission to the viewer.

In response to the PR signal, information containing the beginning of the video program is decoded in time manager 20, which produces a start flag SP corresponding to the address of the segment immediately following the segment containing the video program beginning. It is necessary for the system to select the tap Y that will next "see" the beginning of the video program (which is sequentially passing through memory 12). The start flag SP is used to trigger the segment counter 24 which remembers the number of the segment Y that is selected by time manager 20 and an address corresponding to that segment is produced by address generator 26. In this manner, the appropriate one of taps Y is selected so that the video program will be made available to the viewer at its beginning. As mentioned, the maximum delay the viewer will experience is equal to the duration of one segment. The video program is taken from the selected segment tap by selector 14 and supplied to field memory 16 which, it will be noted, is reset in response to the program request signal PR. Therefore the video program from selector 14 always appears initially at the reset one (first) of the taps N. The output of selector 18 is supplied to the A input of multiplexer 28 which is selected when the start flag SP is generated. (Prior to this time, the B input of multiplexer 28, which is a default input, is selected and messenger/advertiser block 36 is coupled to video encoder 30 and to the viewer 44.) In summary, the viewer receives the video program from its beginning after a delay that is determined by the position of the video program in the segment, the segment length and when the request signal is received. In no case will the wait exceed the length of a segment. During reception of the video program, use counter 22 which was loaded with a number developed by time manager 20 that is indicative of the number of segments in the video program, is clocked by a signal Fv/N which corresponds to the duration of a segment. The number loaded in use counter 22 is compared with the number of elapsed segments in the video program. When the numbers are equal, the END signal is generated by use counter 22, which triggers multiplexer 28 to select input B that is supplied from message/advertising block 36.

Should the viewer wish to interrupt the program for any reason, an interrupt signal is sent over the two-way communications link L and results in the generation of the IR signal. The IR signal is applied to D flip/flop 40 which switches (when permitted by the vertical timing signal Fv to avoid interfield switching) and produces the interrupt signal (INT). The INT signal enables address generator 26 to count up or advance the tap Y addresses as each segment of the video program passes. This is determined by its input clock of Fv/N that corresponds to segment timing. The interrupt signal INT is also supplied to field counter 38 which generates a signal at the field rate Fv to step selector 18 across the field taps N so that the same field of the video program is supplied to the A input of multiplexer 28 as the video program continues through field memory 16. Thus in response to the IR signal, a still or "frozen" picture is sent to the viewer. The address generator 26 is also clocked or incremented (one segment address for each passing segment) which results in the video program being frozen by advancing over the taps Y via selector 14. Consequently, the "interrupted" video program is continuously tracked through segment memory 12 and field memory 16 to freeze the scene. Since the use counter 22 is enabled by the negative INT signal, it stops counting. The count of the segments transmitted to the viewer is retained and when the interrupt is terminated, the use counter is restarted to continue counting the segments of the video program that have been supplied to the viewer. When the interruption is no longer desired, the viewer signals for its end and the IR signal is removed causing flip/flop 40 to remove the INT signal. Therefore when the interruption has ended, the video program is resumed at the precise field at which it was interrupted.

Should the interruption last for less than a segment, the address generator 26 will not have changed the tap Y. The interrupt counter 38 however will have stepped among taps N as each field occurred during the interruption and maintained the video picture in the still or frozen state. When the interrupt signal is removed, the last selected one of taps N continues as the source of the video program for input A of multiplexer 28.

What has been described is a novel communication system which permits viewer interaction with the video source so that a video program may be interrupted and resumed at will by the viewer without loss of continuity. It is recognized that numerous changes in the described embodiment of the invention will be apparent to those skilled in the art without departing from its true spirit and scope. The invention is to be limited only as defined in the claims.

What is claimed is:

1. A method of operating a video communication system comprising:

repetitively transmitting sequential video data defining a video program organized into equal duration segments, each segment comprising a fixed number of fields, in a fifo memory having individual segment taps corresponding to said segments, said video data including information identifying the beginning and ending segments of said video program;

selecting a segment tap corresponding to the beginning of said video program responsive to a viewer request;

supplying said video program from the selected segment tap to a one segment-long resettable fifo memory having field taps corresponding to said fields; and supplying said video program to said viewer from one of said field taps.

2. The method of claim 1 further comprising:

interrupting the progress of said video program in response to a viewer request by stepping over the segment and field taps of the fifo memories in synchronism with said video program.

3. The method of claim 2 further comprising providing alternate video information; and supplying said alternate video information to said viewer before and after said video program.

4. A method of operating an interactive video communication system comprising:

repetitively transmitting a video program in the form of sequential digital data organized into equal duration segments, each segment comprising a plurality of fields, in a fifo memory having a plurality of taps at least equal to the number of said segments in said video program, said data including information identifying the segment including the beginning of said video program and the segment including the end of said video program;

identifying the beginning segment of said video program responsive to a viewer request and selecting the segment tap next to said beginning segment;

supplying said video program from said selected tap to a one segment-long fifo memory having selectable field taps;

transmitting said video program to said viewer from an initial one of said selectable field taps at the beginning of said video program; and freezing the transmission of said video program to said viewer upon receipt of an interrupt signal by stepping across said segment taps and said field taps in synchronism with said video program.

5. The method of claim 4 further including addressing said segment taps with a segment address counter and said field taps with a field counter; and operating said segment address counter and said field counter in response to said interrupt signal.

6. The method of claim 5 further comprising providing alternate video information; and transmitting said alternate video information to said viewer before and after said video program.

7. A video information communication system comprising:

a repetitive sequential source of video data defining a video program divided into fixed length segments, each segment including a number of fields, said video data including information identifying the segments in which the beginning and the end of said video program occur;

a two-way communications link between said source and a viewer;

a segment fifo memory having a plurality of segment taps equal to or greater than the number of segments in said video program supplied with said video data;

a field fifo memory having a number of taps corresponding to the field in one segment;

means for selecting the segment tap next to the beginning segment of said video program and coupling said video program therefrom to said field fifo memory;

means for supplying said video program to said communications link from one of the taps on said field fifo memory; and means for stepping over said segment taps and said field taps in synchronism with said video program in response to an interrupt signal from said communications link to thereby supply a "still" video field in said video program to said viewer.

8. The system of claim 7 wherein said stepping means comprise an address counter and a selector for selecting said segment taps and a field counter and a selector for selecting said field taps, both said address counter and said field counter being activated in response to said interrupt signal.

* * * * *